United States Patent

[11] 3,614,327

[72] Inventors George M. Low
Deputy Administrator of the National Aeronautics and Space Administration with respect to an invention of;
Richard A. Easton, 4500 Woodman Ave. #D-311, Sherman Oaks, Calif.; Edward E. Hilbert, 195 South Wilson Ave., Pasadena, Calif.

[21] Appl. No. 78,065
[22] Filed Oct. 5, 1970
[45] Patented Oct. 19, 1971

[54] DATA MULTIPLEXER USING TREE SWITCHING CONFIGURATION
8 Claims, 6 Drawing Figs.

[52] U.S. Cl. .......... 179/15 A, 179/15 BL, 178/52, 328/104, 328/154, 307/243, 307/251
[51] Int. Cl. .......... H04j 3/04
[50] Field of Search .......... 307/223, 243, 247, 251; 328/104, 154; 178/50, 52; 179/15 A, 15 BL, 15 AP

[56] References Cited
UNITED STATES PATENTS

| | | | |
|---|---|---|---|
| 2,910,542 | 10/1952 | Harris | 179/15 |
| 3,035,185 | 5/1962 | Schwenkler | 307/223 |
| 3,535,450 | 10/1970 | Vollmeyer | 179/15 |
| 3,539,928 | 11/1970 | Gardner et al. | 328/104 |
| 3,427,475 | 2/1969 | Wilkinson et al. | 179/15 BL |

*Primary Examiner*—John S. Heyman
*Attorneys*—J. H. Warden, Paul F. McCaul and John R. Manning

ABSTRACT: A data multiplexer is disclosed in which FETs are arranged in a tree switching configuration of $n$ columns and are driven by $n$ drivers to control the multiplexing of data from $2^n$ sources. Each column of FETs is controlled by a different driver which has two outputs. Only when the driver is clocked are certain of the FETs connected thereto enabled, depending on the input level at one of the driver's two input terminals during the clock pulse period. In the absence of a clock pulse all FETs are in their OFF state. Serial-parallel redundancy of the FETs and in the drivers are employed to increase reliability.

RICHARD A. EASTON
EDWARD E. HILBERT
*INVENTORS*

BY

ATTORNEYS

PATENTED OCT 19 1971 3,614,327

RICHARD A. EASTON
EDWARD E. HILBERT
*INVENTORS*

*BY* J. H. Worden
Paul F. McCaul
ATTORNEYS

RICHARD A. EASTON
EDWARD E. HILBERT
*INVENTORS*

BY J. H. Warden
Paul F. McCaul
ATTORNEYS

INVENTORS
RICHARD A. EASTON
EDWARD E. HILBERT
BY
J. W. Warden
Paul F. McCaul
ATTORNEYS

DATA MULTIPLEXER USING TREE SWITCHING CONFIGURATION

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457)

BACKGROUND OF THE INVENTION

1. Field of the Invention

The present invention generally relates to multiplexing circuitry and, more particularly, to a data multiplexer with a treelike configuration.

2. Description of the Prior Art

The use of data multiplexers in the sampling of signal or data from a plurality of sources, such as sensors is well known. For example, in a spacecraft, sensor signal from various experiments are sampled by means of commutator switches for multiplexing into the down-link telemetry channel. In the prior art, multiplexers were used in a block-type configuration with each multiplexer or commutator switch being driven by its own driver. Such an arrangement requires a large number of components which significantly reduce overall system reliability. With the advent of very long space missions, a need exists for a data multiplexer which includes a minimum number of components, and which is of a configuration to which redundancy of components can be applied at critical points to increase reliability to a desired level. It is further desired to provide a multiplexer with a configuration in which the redundancy to be applied can be achieved with the fewest number of components, yet achieve the desired reliability.

OBJECTS AND SUMMARY OF THE INVENTION

It is a primary object of the present invention to provide a new improved multiplexer.

Another object of the invention is the provision of a data multiplexer with a novel switch configuration to which redundancy is easily applicable.

A further object of the invention is to provide a novel data multiplexer with a minimum number of redundant components to provide a desired level of reliability.

These and other objects of the invention are achieved by providing a data multiplexer with field-effect-transistor (FET) switches which are arranged in a multilevel tree configuration. The FETs in each level or column of the tree are controlled by a separate bistable element such as a flip-flop (FF). In such an arrangement *n* drivers and *n FF's are required to multiplex signals from* $2^n$ sensors. In the absence of component redundancy $2^{(n+1)}-2$ FETs are required. However, by applying component redundancy such as serial-parallel connected FETs in place of single FETs which control the paths of signals from large numbers of sensors, overall reliability is greatly increased. Overall reliability is further enhanced by incorporating a novel driver with component redundancy.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
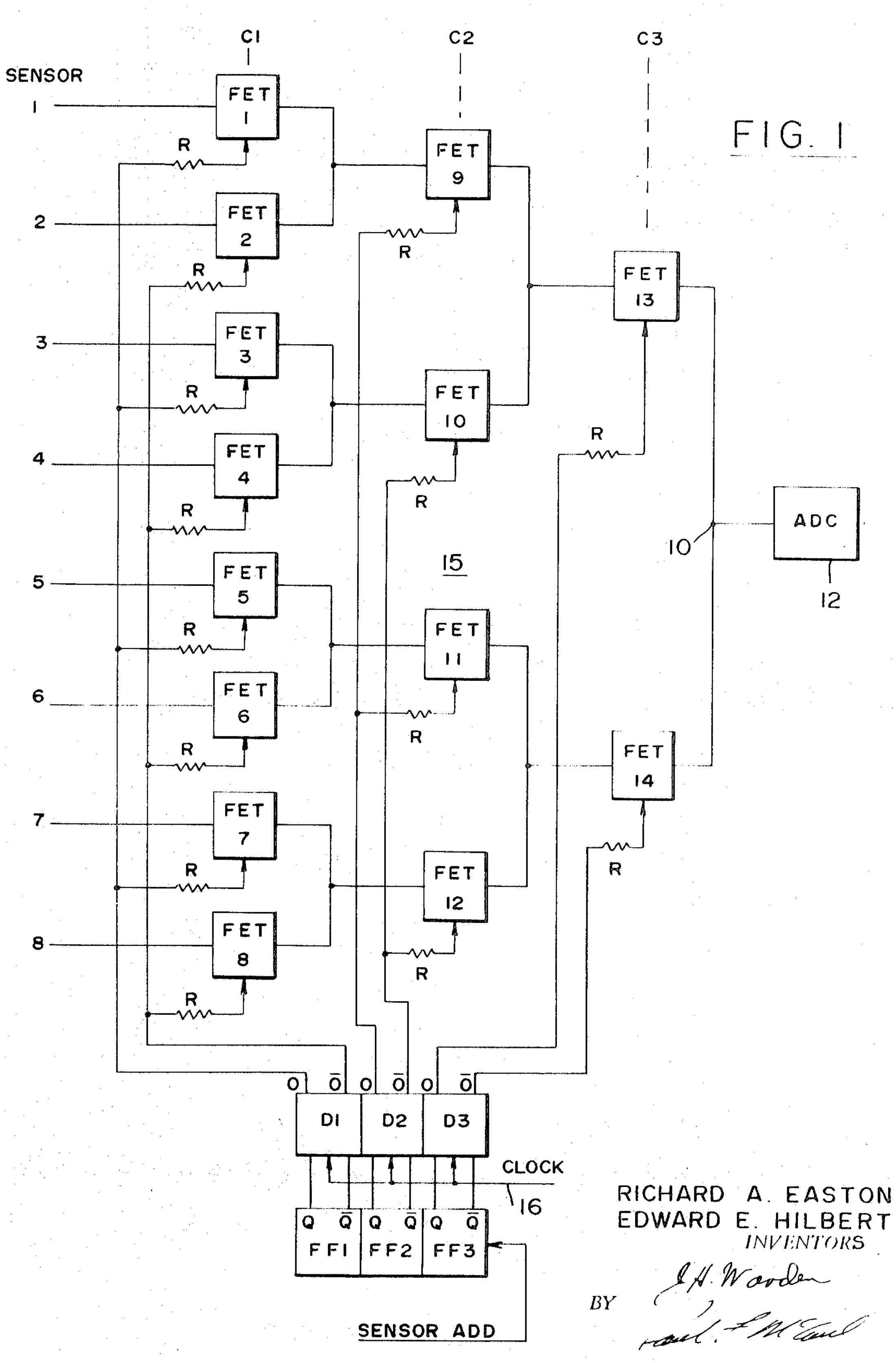
FIG. 1 is a block diagram of one embodiment of the invention.

Attention is first directed to FIG. 1 which is a diagram of the basic multiplexer of the present invention with the treelike configuration. For explanatory purposes, the arrangement in FIG. 1 is limited to multiplexing the outputs of eight ($2^3$) sensors to a common output terminal 10. The output terminal is assumed to be connected to an analog to digital converter (ADC) 12. The treelike configuration, designated by numeral 15 includes 14 FETs arranged in three columns C1–C3. The FETs in each column are controlled by the outputs of a different driver, the three drivers being designated D1–D3. Each driver has two outputs 0 and $\overline{0}$ , with each output controlling a different group of FETs. As shown, the 0 output of each driver controls the odd-numbered FETs in its corresponding column while the $\overline{0}$ output controls the even-numbered FETs. For explanatory purposes, a FET is enabled or ON when the driver's output is at ground or zero volt and is disabled or OFF when the driver's output is a negative voltage, e.g., −20 volts. A current limiting resistor R of a selected value, e.g., 20 kΩ, is placed between each FETs gate and the appropriate driver's output line. This isolates FET failures from affecting the operation of the driver.

Each driver is controlled by the complementary outputs Q and $\overline{Q}$ of a corresponding FF and by a clock signal supplied thereto via a clock line 16. The combined states of the three FFs, designated FF1–FF3 define each sensor's address. The FFs may be addressed from any appropriate source, such as a computer. The manner in which the FFs are addressed does not form part of this invention and therefore will not be described in further detail.

In the particular arrangement, shown in FIG. 1, in the absence of a clock signal, the two outputs 0 and $\overline{0}$ of each driver are at −20 volts and therefore all FETS are OFF. Then, when a clock signal is applied, depending on the state of the driver's control FF one driver output is raised to about 0 volt thereby turning ON all the FETs connected thereto, while the other driver's output remains at −20 volts, thereby maintaining all the FETs connected thereto in their OFF state. For explanatory purposes, it is assumed herein that when a FF is in its set (or 1) state, the output Q is high and $\overline{Q}$ is low and therefore the driver's 0 output is at zero volt and the $\overline{0}$ output is at −20 volts, when the driver is clocked. The reverse conditions exist when the FF is in its reset (or 0) state.

As seen from FIG. 1, in the particular embodiment for 8 or $2^3$ sensors, the path from the output of each sensor to output terminal 10 is controlled by three FETs, one in each column. The three FETs which are enabled to multiplex a sensor's output depends on the combination of the states of the three FFs. For example, when their combined states is 111, when the clock signal is applied to the drivers, FETs 1, 9 and 13 are enabled. Thus, the output of sensor 1 is applied to output terminal 10. On the other hand, when the states of the three FFs is 000, FETs 8, 12 and 14 are enabled.

From the foregoing description, it should be appreciated that in the present invention, *n* drivers and *n* FFs are needed to control the multiplexing of the outputs of $2^n$ sensors. All the FETs in the tree configuration are in their OFF states except when the drivers are clocked. In practice, they are clocked only after a new address is shifted or loaded in the FFs. Thus, during addressing, all the FETs are inhibited from switching. This is a significant feature since it eliminates unnecessary power dissipation in the FETs capacitive load, during sensor addressing. In one particular embodiment of a 512-sensor tree switched at 10,000 samples/sec., power dissipation in the FETs internal capacitance was found to be about 50 m watts. Also, the use of clockable drivers effectively lowers the power duty cycle of the drivers themselves, limiting power dissipation to the clock pulse duration. Very short duration clock pulses may be used with an ADC using a sample and hold input. Alternately, the clock pulse width can be made slightly longer than the digitizing cycle time of the ADC.

Disregarding for a moment the reliability of the drivers and the FFs, it should be appreciated that the reliability of the tree arrangement 15 depends on the reliability of the various FETs included therein. Due to the tree arrangement, the number of sensors which are affected by the failure of any FET, depends on the location of the FET in the tree. Clearly, failure of FETs nearer to the ADC would affect a larger number of sensors. This undesired effect is easily overcome by replacing the single FETs in one or more columns nearest to the ADC by parallel-series redundant FETs.

Figure 2:
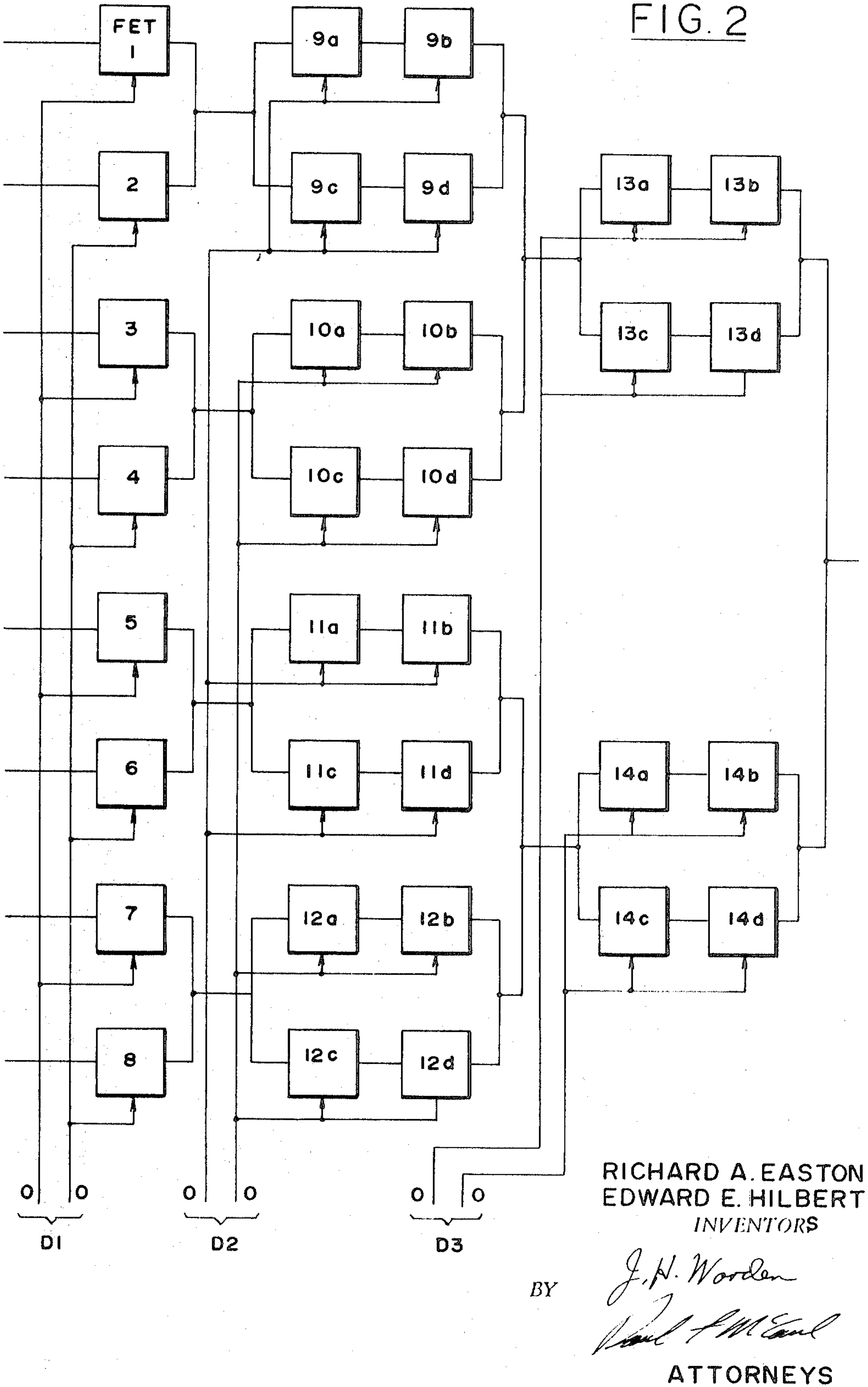
FIG. 2 is a block diagram of another embodiment of the invention with FET redundancy.

As seen from FIG. 2, to which reference is now made, the arrangement shown in FIG. 1 may be modified to include four parallel-series redundant FETs for each of FETs 9–14. The four redundant FETs are designated by the FET's numeral followed by the suffixes *a–d*. It should be stressed that the columns in which component redundancy is applied and the type of redundancy, namely the number of parallel branches and the number of serially connected FETs depend on the desired reliability and the number of expected failing FETs. One of the major advantages of the tree configuration is the ease with which redundancy can be implemented. As the tree grows in size, this condition improves since the percentage of parts which will affect a given percentage of sensors, steadily decreases. Therefore, if the number of sensors doubles, the percentage is halved.

Figure 3:
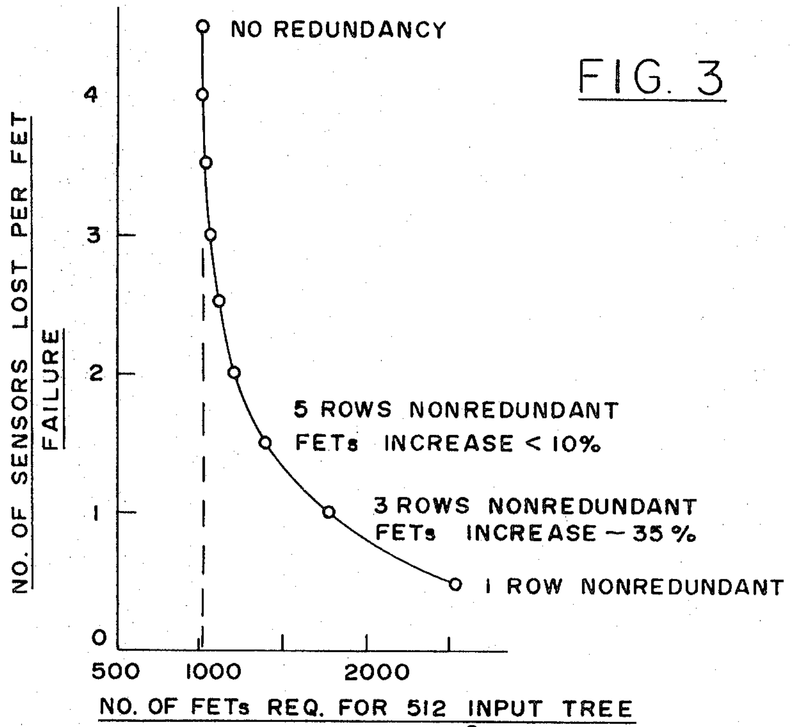
FIG. 3 is a curve useful in explaining the increase of reliability as a function of FET redundancy.

Fig. 3, to which reference is now made is a graph useful in summarizing tree reliability versus redundancy, for a 512 input tree. In such a tree, the FETs are arranged in 9 columns. The number of FETs is designated along the abscissa and the average number of sensors lost per FET failure is designated along the ordinate. As seen therefrom, the average number of sensors lost per FET failure decreases as redundancy increases. It is appreciated that redundancy increases the number of required FETs. However, this price in terms of actual component cost, circuit complexity and increased size and weight may be less significant than the increase in reliability which in many applications is of primary importance.

Figure 4:
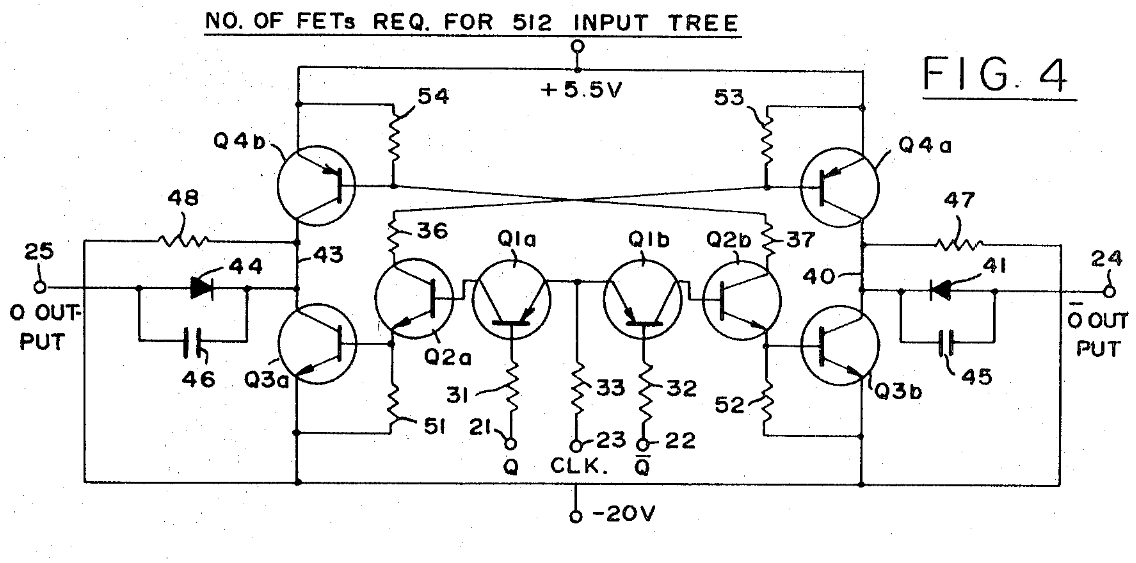
FIG. 4 is a schematic diagram of one embodiment of a driver shown in FIG. 1.

Attention is now directed to FIG. 4 which is a schematic diagram of one embodiment of a clockable driver, of the type shown in FIG. 1. Basically, the driver includes three input terminals 21—23 connected to the Q and $\overline{Q}$ outputs of the control FF and to the clock line, and two output terminals 24 and 25 at which the driver's 0 and $\overline{\mathbf{0}}$ outputs are available. Terminals 21 and 22 are connected to the bases of transistors Q1*a* and Q1*b* through respective resistors 31 and 32, while terminal 23 is connected to the emitters of these transistors through a common resistor 33. The collectors of Q1*a* and Q1*b* are respectively connected to the bases of transistors Q2*a* and Q2*b*, with the emitter of the latter being connected to the respective bases of transistors Q3*a* and Q3*b*. The collectors of Q2*a* and Q2*b* are connected to the bases of Q4*a* and Q4*b*, respectively through resistors 36 and 37. The emitters of Q4*a* and Q4*b* are connected to +5.5 v. and the emitters of Q3*a* and Q3*b* are connected to −20 v. The collectors of Q3*b* and Q4*a* are connected together at a junction point 40 which is connected to terminal 24 through a diode 41, while the collectors of Q3*a* and Q4*b* are tied together at a point 43 which is connected to terminal 25 through a diode 44. Capacitors 45 and 46 are shunted across diodes 41 and 44, respectively. Also, points 40 and 43 are connected to −20 v. through resistors 47 and 48, respectively. In addition, resistors 51–54 interconnect the base and emitters of Q3*a* and Q3*b*, Q4*a* and Q4*b*, respectively.

In operation, as long as the driver is not clocked, points 40 and 43 and therefore outputs 0 and $\overline{\mathbf{0}}$ are at −20 v. Thus, all FETs connected thereto are assumed to be OFF. Then, when a positive clock signal assumed to be of about +5 v. is applied to terminal 23, Q1*a*, Q2*a*, Q3*a* and Q4*a* or Q1*b*, Q2*b*, Q3*b* or Q4*b* are turned ON, depending on whether $\overline{Q}$ or Q is positive at about +5 v. Assuming that Q is raised to +5 v., Q4*b* is switched ON, and point 43 rises from −20 v. to about +5 v. Also, since Q3*b* turns ON point 40 and therefore output $\overline{\mathbf{0}}$ are at about −20 v. Consequently, all FETs connected to $\overline{\mathbf{0}}$ remain cut OFF. As point 43 rises from −20 v. to +5 v., output 0 rises until 0 volt is reached when the FETs connected to the 0 output are switched ON. Thereafter, diode 44 is backbiased so that terminal 25 (or the 0 output) is at about 0 volt while point 43 continues to rise to − 5 v.

Figure 5:
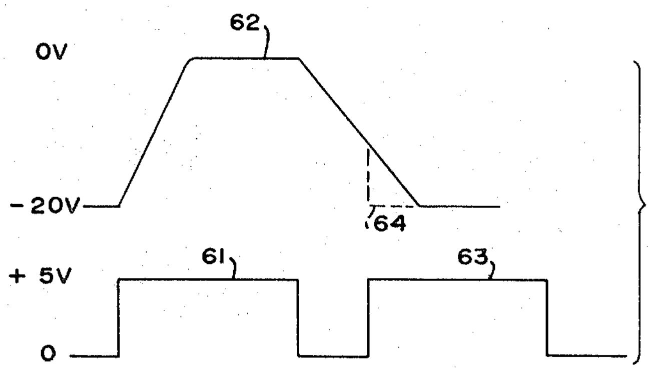
FIG. 5 is a waveform diagram useful in explaining the operation of the driver shown in FIG. 4.

After the termination of the clock signal Q1*b*, Q2*b*, Q3*b*, and Q4*b* are cut OFF. When Q4*b* is cut OFF point 43 returns to −20 v. at a rate controlled by the time constant defined by resistor 48 and capacitor 46. The voltage level at terminal 25 (0 output) in response to a clock signal 61 is diagrammed in FIG. 5, wherein the voltage level is designated by line 62. It should be pointed out that due to the incorporation of transistors Q3*a* and Q3*b* in the driver, a second clock signal 63 can be received (and assuming $\overline{Q}$ is positive) before the level at point 43 discharges to −20 v., since the presence of Q3*a* which is switched ON when $\overline{Q}$ is positive would pull point 43 to −20 v. as indicated by dashed line 64.

Figure 6:
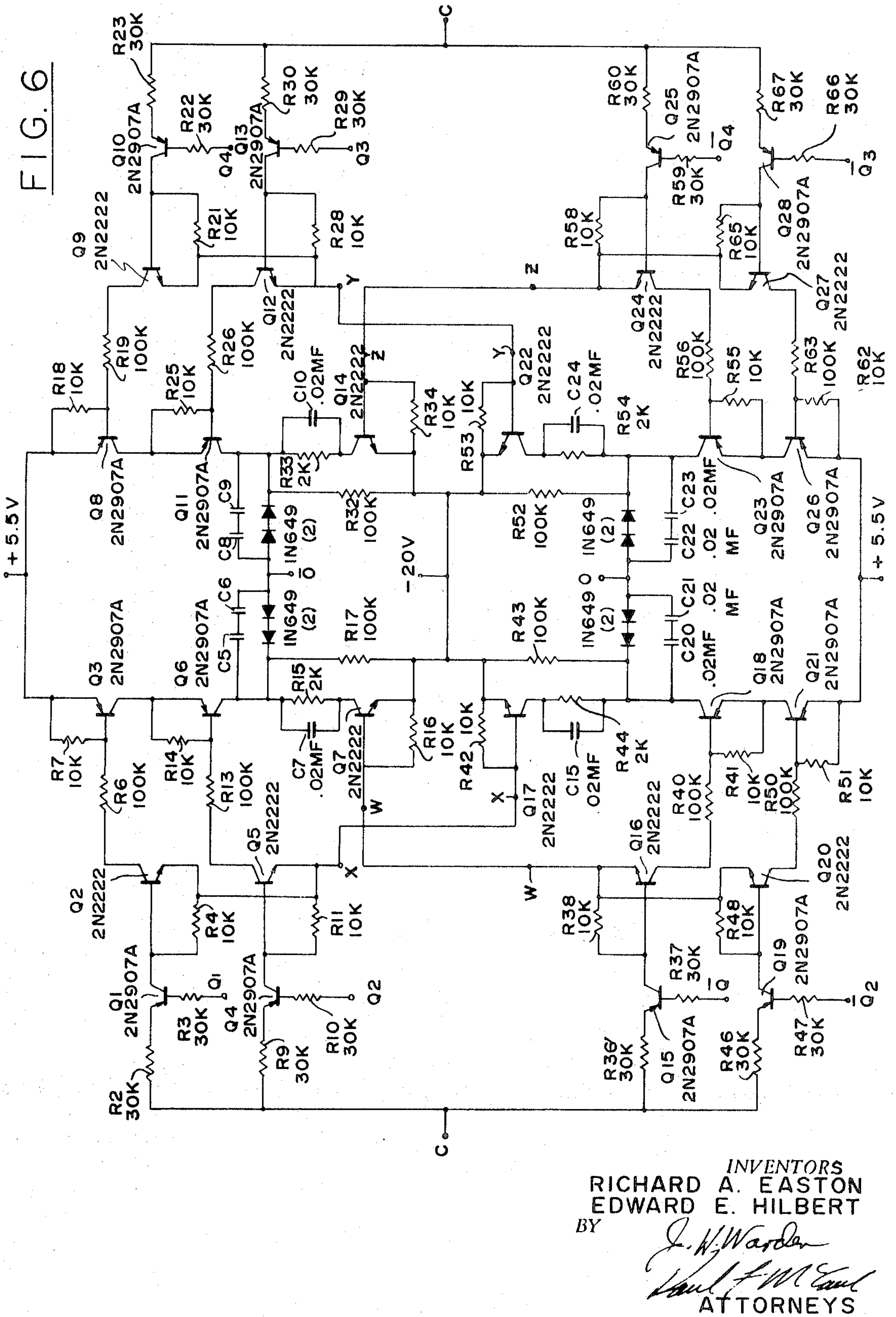
FIG. 6 is a schematic diagram of a driver with series-parallel component redundancy.

It should be appreciated that the overall reliability of the novel multiplexer greatly depends on the reliability of the operation of the drivers and the FFs. This is particularly true because *n* drivers control $\mathbf{2}^n$ signal paths. The reliability of each driver can be enhanced greatly by constructing each with redundant components, such as are shown in FIG. 6 to which reference is made herein. FIG. 6 represents a complete schematic diagram of an embodiment of a driver which was actually reduced to practice. Therein, serial and parallel redundancy is employed. Each of the single transistors Q1*a*, Q1*b*, Q2*a*, Q2*b*, Q3*a*, Q3*b*, Q4*a* and Q4*b* in FIG. 4 is represented by a series-parallel redundant switching structure in FIG. 6. This redundancy structure is provided for all stages of the original nonredundant driver; even the FF register and clock input interfaces are redundant. Thereby, no one failure of a FF register and a clock interface can result in loss of driver operation.

The particular driver was designed to activate up to 1024 FETs. The characteristics of the clock signal are typically 1 μs minimum duration, 100 kHz. maximum frequency with 10n sec. rise and fall time (frequency, pulse duration, rise time etc. ). The redundant driver was designed so that no short or open condition of any one component between any of its terminals will cause a loss of operation. In addition, most double failures will not cause loss of operation. This greatly increases overall operational reliability over that possible when one device failure can cause loss of operation. It is appreciated that the driver with redundant components is more expensive and complex than the nonredundant driver. However, since *n* drivers are sufficient to control the multiplexing of $\mathbf{2}^n$ sources, the added complexity is a small price for the increased reliability.

There has accordingly been shown and described herein a data multiplexer in which FETs are arranged in a tree switch configuration. The FETs are switched by clockable drivers, *n* drivers being required for multiplexing $\mathbf{2}^n$ sources. Each driver is also controlled by a bistable element such as a FF, the *n* FFs forming a register, which can be loaded under computer command. Minimum power is consumed in the standby mode when the clock input is low representing the absence of the pulse. In this mode, power consumption is due only to leakage and was found to be about 10μw. When a clock pulse is applied, i.e., the clock input is high, one output of the driver is high (e.g., +5.5v.) turning on all the FETs connected thereto. Power dissipation while the clock input is high is about 7.5μw. Which driver output goes high when the driver is clocked depends on the state of the driver's control FF. With the driver herebefore described, switching rise and fall times are approximately 1μs even for several thousand pf loads.

The use of the clocked driver circuit has the following advantages:

1. The tree is easily inhibited from switching while a new sensor address is loaded into the register which consists of the FFs.

2. The use of the clock pulse effectively lowers the power duty cycle of the driver itself.

It is appreciated that various modifications and variations may readily occur to those skilled in the art and, consequently, it is intended that the claims be interpreted to cover such modifications and equivalents.

What is claimed is:

1. A multiplexer for controllably connecting the output of each of a plurality of signal sources to a common output terminal comprising:

a plurality of interconnected switchable elements arranged in $n$ columns, connected between said signal sources and said common output terminals, each element being switchable between on and off states, with the number of sources being not greater than $2^n$;

$n$ drivers, each being drivable to be in at least a first state or a second state;

means for connecting each driver to the elements in a different column, whereby each element in a first group of elements in the column is switched to its on state when said driver is in the first state and each element in a second group of elements in the column is switched to its on state when said driver is in said second state; and control means connected to said drivers for controlling the state of each of said drivers to control a selected combination of elements in said $n$ columns to be in the on state thereby to provide a signal path between one of said sources and said common output terminal.

2. The arrangement as recited in claim 1 wherein each of said elements is a solid-state element.

3. The arrangement as recited in claim 2 wherein each element in at least one of said columns comprises a plurality of elements connected in a parallel-series arrangement for providing an appropriate signal path thereacross irrespective of the failure of one of the elements in said arrangement.

4. The arrangement as recited in claim 2 wherein said solid-state element is a field-effect transistor.

5. The arrangement as recited in claim 4 wherein each element in at least one of said columns comprises a plurality of elements connected in a parallel-series arrangement for providing an appropriate signal path thereacross irrespective of the failure of one of the elements in said arrangement.

6. The arrangement as recited in claim 1 wherein each driver includes a first and second output connected to the first and second groups of elements in the column with which said driver is associated, first and second control inputs and a clockable input at which a clock pulse is appliable and a plurality of transistors connected between said inputs and said outputs, whereby during the application of a clock pulse to said clockable input, said driver is switched to its first or second state as a function of the signals applied to said first and second control inputs, and in the absence of a clock pulse both said outputs are at a selected potential for maintaining all the elements connected thereto in their off state, irrespective of the signals applied to said first and second control inputs.

7. The arrangement as recited in claim 1 wherein each of said elements is a field-effect transistor including a gate electrode and a resistor connected between said gate electrode and one of the outputs of said drivers.

8. The arrangement as recited in claim 6 wherein each of said elements is a field-effect transistor and wherein each element in at least one of said columns comprises a plurality of elements connected in a parallel-series arrangement for providing an appropriate signal path thereacross irrespective of the failure of one of the elements in said arrangement.